2,806,345
Patented Sept. 17, 1957

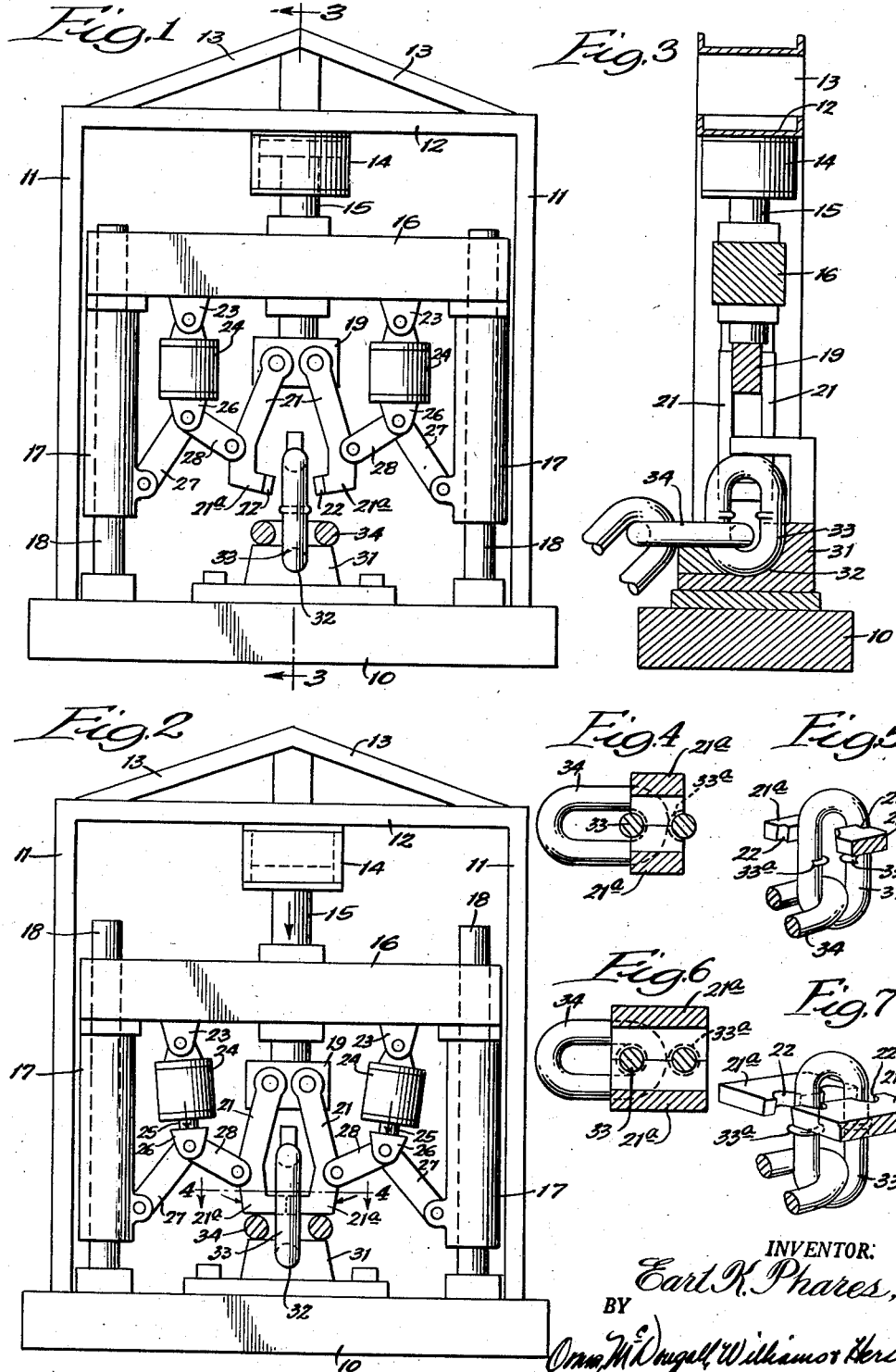

2,806,345

MACHINE FOR TRIMMING WELD FLASH FROM CHAIN LINKS

Earl K. Phares, Hammond, Ind., assignor to S. G. Taylor Chain Company, Hammond, Ind., a corporation of Illinois Application May 12, 1954, Serial No. 429,233

3 Claims. (Cl. 59—29)

This invention relates to a machine for trimming from chain links the weld flanges or "fins" which result when chain links are formed by welding together two U-shaped pieces of metal stock. In particular, the present invention is addressed to a machine for trimming short links wherein the inner dimension of the link is only two and one-half to three times the thickness of the metal stock from which the link is formed.

The manufacture of chain customarily involves either the bending of metal stock into a completely closed loop, following by an operation in which the abutted ends of the stock are welded together, or the formation of links out of U-shaped pieces of metal stock, in the course of which a pair of U-shaped pieces are abutted together and a pair of welds is simultaneously made to form a closed link. It is with respect to this last type of link manufacture that the present invention is primarily useful.

When chain is made in the manner just described, the welding normally results in formation on the sides of the link of annular flanges or "fins" produced by radial outward flow of the molten metal. Generally speaking, those welding flanges must be trimmed off shortly after the link is welded and while the metal is still hot and somewhat plastic, since their removal after the link has fully cooled is much more difficult.

Removal of the flanges is desirable, in the completed chain, because the metal in the flange is usually oxidized and unsightly in appearance, tending to create the impression, if not removed, that the link is not sound and strong. Moreover, the flanges, if left on the links, would interfere with normal handling of the chain and might cause cuts or other injuries to persons handling it.

Trimming off the outside portions of the flanges is usually substantially easier than trimming the inside portions. For example, machines designed in accordance with the Taylor Patent 2,125,967 may be used effectively for trimming the outside portions of the flanges. Trimming the inside portions of the welding flanges, however, is more difficult because of the presence of the adjacent link, which always occupies a portion of the space inside the chain link being trimmed. This problem is not so critical in cases where the link of the inner dimension of the link is several times greater than the thickness of the stock from which the links are formed, but it is serious in making chains in which the links are relatively short.

It is accordingly the principal object of the present invention to provide a machine for trimming chain links, particularly the inside portions of the welding flanges, in applications wherein the links are short.

Another object of the present invention is to provide a machine wherein a newly welded chain link can be placed promptly after the welding operation and be trimmed without interference from the earlier formed links in the chain.

Other objects and advantages of the present invention will appear from the detailed description which follows.

In the appended drawing, Figure 1 shows a front elevation view of a machine embodying the present invention, the moving parts in Fig. 1 occupying the positions they will normally have when a newly formed link is being placed in the machine for trimming. Fig. 2 shows the machine of Fig. 1 as it appears during the trimming operation. Fig. 3 is a sectional view, taken along the line 3—3 of Fig. 1, showing other structural details of the machine. Fig. 4 is a fragmentary sectional view taken along the line 4—4 of Fig. 2, showing the positions of the link being trimmed, the next older link, and the cutting dies of the machine, during the actual trimming action. Fig. 5 is a perspective view showing in greater detail the position which the link being trimmed occupies with respect to the trimming dies when the machine is in the Fig. 1 position. Figs. 6 and 7 are views corresponding to views 4 and 5 but showing cutting dies of an alternative conformation.

Referring now to Fig. 1, I show therein my link-trimming machine mounted on a massive base 10 and comprising an upright frame 11, which may be made of steel channels. Frame 11 comprises a pair of supporting uprights joined across the top by a transverse channel member 12, reinforced by a pair of channels 13.

Mounted on the under side of the transverse frame member 12 is a pneumatic or hydraulic power cylinder 14, which may be of conventional design. The piston rod 15 of cylinder 14 supports a transverse boom 16 which extends in the plane of frame 11 and extends nearly the entire distance between the upright members of frame 11. At its two outer extremities the boom 16 carries a pair of vertically disposed tubular extensions 17 which are slidably carried on upright guide members 18 mounted on base 10.

At the midpoint of the under side of boom 16, directly under piston rod 15, there is mounted a pivot-carrying extension 19 which serves as support for a pair of symmetrically formed, pivoted die members 21. The boss or shanks of die members 21 are bifurcated, as shown in Fig. 3, and they both terminate at their lower ends in inwardly extending portions 21a which are formed for mutual cooperation. The extensions 21a are carried at an angle with respect to the shank portions of die members 21 such that, when the extensions 21a abut, they occupy in a horizontal position directly beneath piston rod 15.

The facing surfaces of die members 21a are cut away at their corners to provide on each die member a pair of arcuate cutting or shearing tools 22 which, as will be more fully explained, perform the actual operation of shearing the welding flanges from the chain links. Symmetrically spaced on boom 16 between the pivot support 19 and the guide members 17 are a pair of downwardly depending bifurcated bosses 23 which serve as pivot supports for a pair of power cylinders 24, which may be pneumatic or hydraulic. (The hose connections and control valves for the power devices 14 and 24 are not shown in the drawing, since they may be conventional.)

The piston rods 25 of power devices 24 respectively terminate in bifurcated pivot members 26. Each of the members 26 serves as pivotal support for a link 27 and a link 28. The ends of the links 27 opposite the pivots 26 are respectively pivoted to tubular extensions 17, as shown in Figs. 1 and 2, while the corresponding ends of the links 28 are pivoted to die members 21.

Mounted on base 10 directly beneath the member 19 is a link-support member 31 which is provided with a recess 32 shaped to receive one end of a chain link 33 and to support it in an upright position with the plane of the link 33 perpendicular to the plane of the die members 21. Link-support member 31 is provided also with a top surface serving to receive and support chain link 34, which is typical of the next-to-last link of a chain being fabricated, the last link being link 33 from which the welding flanges are to be trimmed by my machine.

The depth and shape of recess 32 are adapted so as to hold link 33 in substantially the highest position it can occupy and at the same time permit adjacent link 34 to rest on the top surface of support member 31.

The particular conformation of the cutting dies 21a will depend on the shape of the chain being trimmed and on the portion of the welding flange to be trimmed off by them. If the outer portions of the flanges are being trimmed by means of some other machine, such as that described in the aforementioned Taylor Patent No. 2,125,967, the dies 21a may be shaped generally in accordance with the showing in Figs. 1–5, wherein the arcuate cutting edges 22 each subtend substantially 90° of the circumference of the steel stock forming the link being sheared. If, on the other hand, my machine is being employed to accomplish both inside and outside trimming of the welding flanges, then the dies are preferably formed in the manner shown in Figs. 6 and 7, wherein the shearing edges 22 each subtend one-half of the circumference of the stock from which the links are formed.

In operation, the just-welded link 33 is placed in the recess 32 of support member 31, in the position shown in Figs. 1 and 2, and pneumatic or hydraulic pressure, as the case may be, is applied to power devices 24 and 14. Preferably the valving should be arranged so that power devices 24 are energized slightly before power device 14.

When that has been done, the die members 21 move together into abutment, as shown in Figs. 4 and 6, and immediately thereafter the entire structure supported on piston rod 15 moves downward responsively to the energizing of power device 14. The downward movement of die members 21 causes the welding flanges 33a to be sheared off by the shearing edges 22, half or all of the flanges 33a being removed, according to whether the dies used are made in accordance with Fig. 5 or Fig. 7. (It will of course be understood that the precise conformation of the dies 21 and the shaping of their cutting edges is a matter of design which may be altered in accordance with the particular application.)

In the shearing off of the welding flanges 33a, the link 34 does not interfere, since it reposes on the top of support member 31 in a position which does not interfere with the action of the dies 21. As shown in Fig. 2, the range of downward movement of the dies 21 will normally be adjusted so that they come to rest at or slightly above the upper surface of the link 34 resting on the recessed support member 31.

From the foregoing description of the operation of my link-trimming machine, it will be understood that I can successfully trim the welding flanges away from short links, the only requirement being that the inner opening of the link have a length about two and one-half times or more the thickness of the metal stock from which the links are formed.

It will of course be understood that many changes and variations in the structure described may be made by persons skilled in the art without departing from the spirit of my invention. It is accordingly my desire that the scope of my invention be determined primarily from the appended claims and that the illustrated embodiments of my invention be regarded as exemplary only.

I claim:

1. In a machine for trimming the welding flanges from the freshly welded link at the end of a length of chain, the combination which comprises a base member having an upper surface adapted to receive and support the next-to-last link and having also a well recessed below said upper surface and shaped to receive the freshly welded end link in an upright position, the depth of said well relative to said upright surface being proportioned to hold said end link in a position whereat its welding flanges are above the top of said next-to-last link, a pair of symmetrical shearing dies mounted above said base member and mounted for movement between an advanced position and a retracted position, said dies when in their retracted position affording clearance for said end link to be inserted in said well and, when in their advanced position, abutting in the space enclosed by said end link, and means normally operative to hold said dies in their retracted position and operative responsively to manual control to move said dies to their advanced position and means to lower the same toward said base member, whereby said dies during said downward movement will engage and shear off at least a portion of said welding flanges.

2. Apparatus according to claim 1 wherein said second means comprises a frame having a horizontal member and a pair of downwardly depending vertical members, said die members being pivotally suspended from said horizontal frame member, said frame comprising also motor means for retracting and advancing said dies, said motor means including mechanical linkage joining said dies to said vertical frame members, whereby at least a part of the force exerted by said motor means is applied between said die members and said vertical frame members for advancing and retracting said dies.

3. Apparatus according to claim 1 wherein each of said die members is provided with a pair of shearing edges, each of which is shaped to conform to the normal outer surface of said link around 180° of the circumference thereof, the shearing edges of the respective dies being so positioned with respect to one another that said cutting edges completely surround the respective legs of said end link when said dies have been moved to their advanced position.

References Cited in the file of this patent

UNITED STATES PATENTS

| 812,281 | Masion | Feb. 13, 1906 |
| 897,256 | Fraser | Aug. 25, 1908 |
| 912,208 | Tompkins | Feb. 9, 1909 |
| 1,983,683 | Stahl | Dec. 11, 1934 |
| 2,125,967 | Taylor et al. | Aug. 9, 1938 |
| 2,225,127 | Oppenheim | Dec. 17, 1940 |
| 2,256,558 | Harder | Sept. 23, 1941 |
| 2,358,197 | Winter | Sept. 12, 1944 |

FOREIGN PATENTS

| 384,560 | France | Apr. 14, 1908 |
| 189,916 | Switzerland | Mar. 31, 1937 |
| 518,627 | Belgium | Apr. 15, 1953 |